United States Patent
Ternoy et al.

(10) Patent No.: US 9,073,628 B2
(45) Date of Patent: Jul. 7, 2015

(54) FLUIDIC MICRO-GENERATOR OF SYNTHETIC JETS

(75) Inventors: Frederic Ternoy, Feuchy (FR); Etienne Uzeel, Radinghem en Weppes (FR); Didier Landaes, Wasquehal (FR)

(73) Assignee: ONERA (Office National D'Etudes et de Recherches Aerospatiales), Chatillon (FR)

( * ) Notice: Subject to any disclaimer, the term of this patent is extended or adjusted under 35 U.S.C. 154(b) by 576 days.

(21) Appl. No.: 13/325,522

(22) Filed: Dec. 14, 2011

(65) Prior Publication Data

US 2012/0153041 A1 Jun. 21, 2012

(30) Foreign Application Priority Data

Dec. 14, 2010 (FR) ...................... 10 60487

(51) Int. Cl.
*B64C 21/04* (2006.01)
*B64C 23/00* (2006.01)
*F15D 1/00* (2006.01)

(52) U.S. Cl.
CPC ............. *B64C 21/04* (2013.01); *B64C 2230/18* (2013.01); *F15D 1/0095* (2013.01); *Y02T 50/166* (2013.01)

(58) Field of Classification Search
CPC ...... B64C 21/02; B64C 21/025; B64C 21/04; B64C 21/06; B64C 23/005; B64C 2230/18; Y02T 50/166; F15D 1/0095; B05B 1/005
USPC ........ 239/4, 102.1, 102.2, 589; 244/207–209; 417/413.2, 415–417
See application file for complete search history.

(56) References Cited

U.S. PATENT DOCUMENTS

| 6,899,302 | B1* | 5/2005 | Hassan et al. | 244/208 |
| 2002/0081198 | A1* | 6/2002 | Hassan et al. | 416/90 A |
| 2006/0202592 | A1* | 9/2006 | Ruggeri et al. | 310/349 |
| 2008/0087771 | A1* | 4/2008 | Boespflug et al. | 244/207 |
| 2008/0152521 | A1* | 6/2008 | Birchette | 417/481 |

(Continued)

FOREIGN PATENT DOCUMENTS

| FR | 2740276 A1 | 4/1997 |
| FR | 2859160 A1 | 3/2005 |
| FR | 2890637 A1 | 3/2007 |

OTHER PUBLICATIONS

Arvault, "La piézoélectricité entre dans une ère nouvelle," *Arts et Metiers magazine*, Apr. 2007, pp. 21-23.

(Continued)

*Primary Examiner* — Darren W Gorman
(74) *Attorney, Agent, or Firm* — Patterson Thuente Pedersen, P.A.

(57) ABSTRACT

Generator (1) of synthetic jets (2) for a main flow of fluid, comprising a cavity (10) delimited by a fixed wall (13) and a mobile wall. The fixed wall comprises a sleeve (8) and a head (4) provided with an orifice (14) through which the generated jet of fluid (2) is drawn in from and ejected into the main flow of fluid. The mobile wall is opposite the head. The generator comprises a rigid piston (3) including the mobile wall and sliding in a fluid-tight manner in the sleeve (8), and comprises an actuator mechanically linked with the piston and able to drive the piston with an alternating movement having an amplitude and a frequency. The actuator is capable of providing a movement of variable amplitude and frequency, at least the amplitude being variable during the movement. The actuator comprises a mechanism for the mechanical amplification of displacement.

22 Claims, 7 Drawing Sheets

(56) References Cited

U.S. PATENT DOCUMENTS

2010/0044459 A1   2/2010   Xu et al.
2010/0051242 A1   3/2010   Arik et al.
2011/0232792 A1*  9/2011   Oates et al. ................... 138/45

OTHER PUBLICATIONS

Crittenden et al., "A high-speed, compressible synthetic jet," *Physics of Fluids*, vol. 18, 2006, 18 pages.
French Preliminary Search Report which corresponds to French Patent Application No. 10 60487, dated Sep. 22, 2011, 2 pages.

* cited by examiner

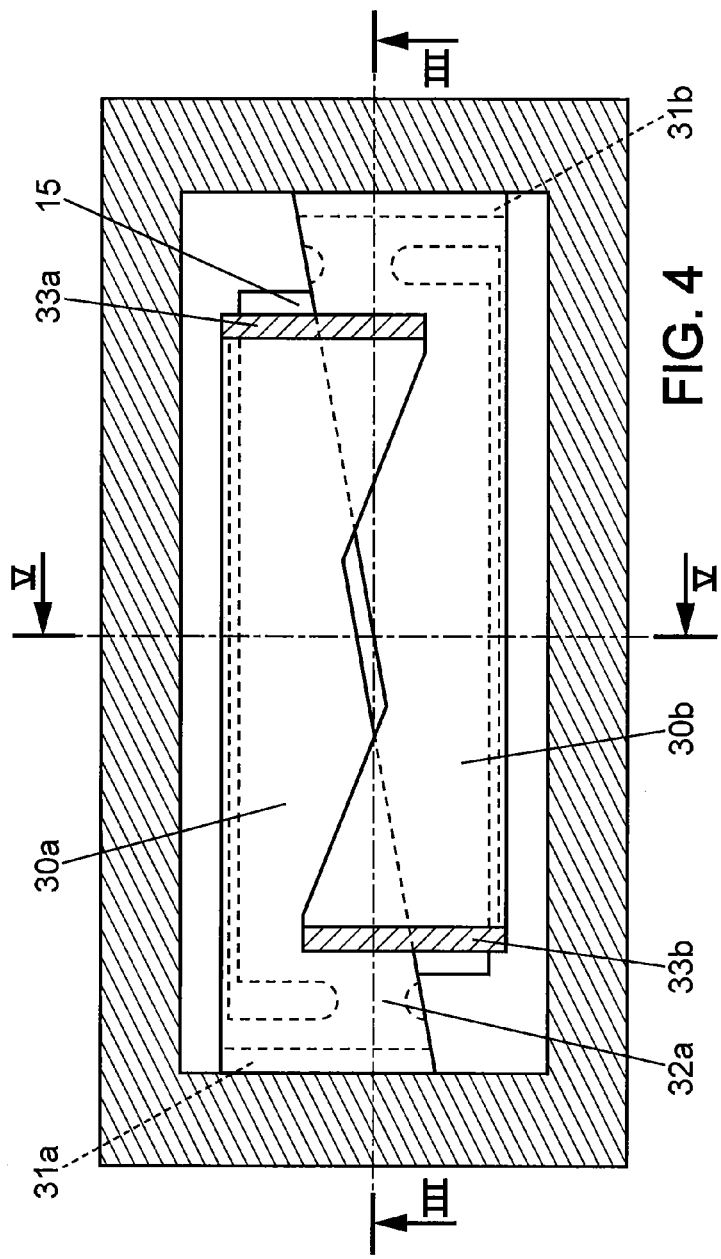
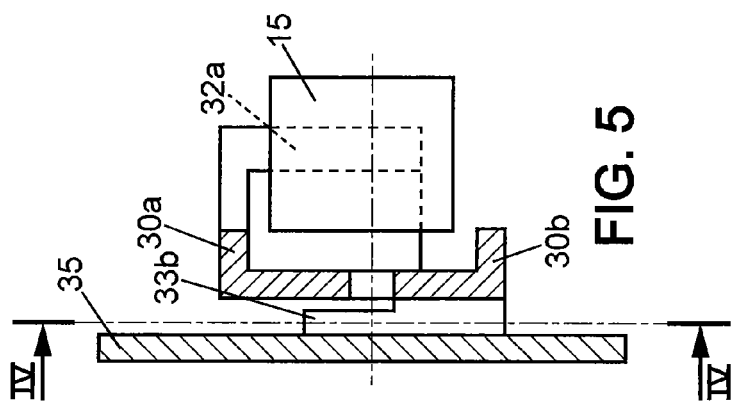

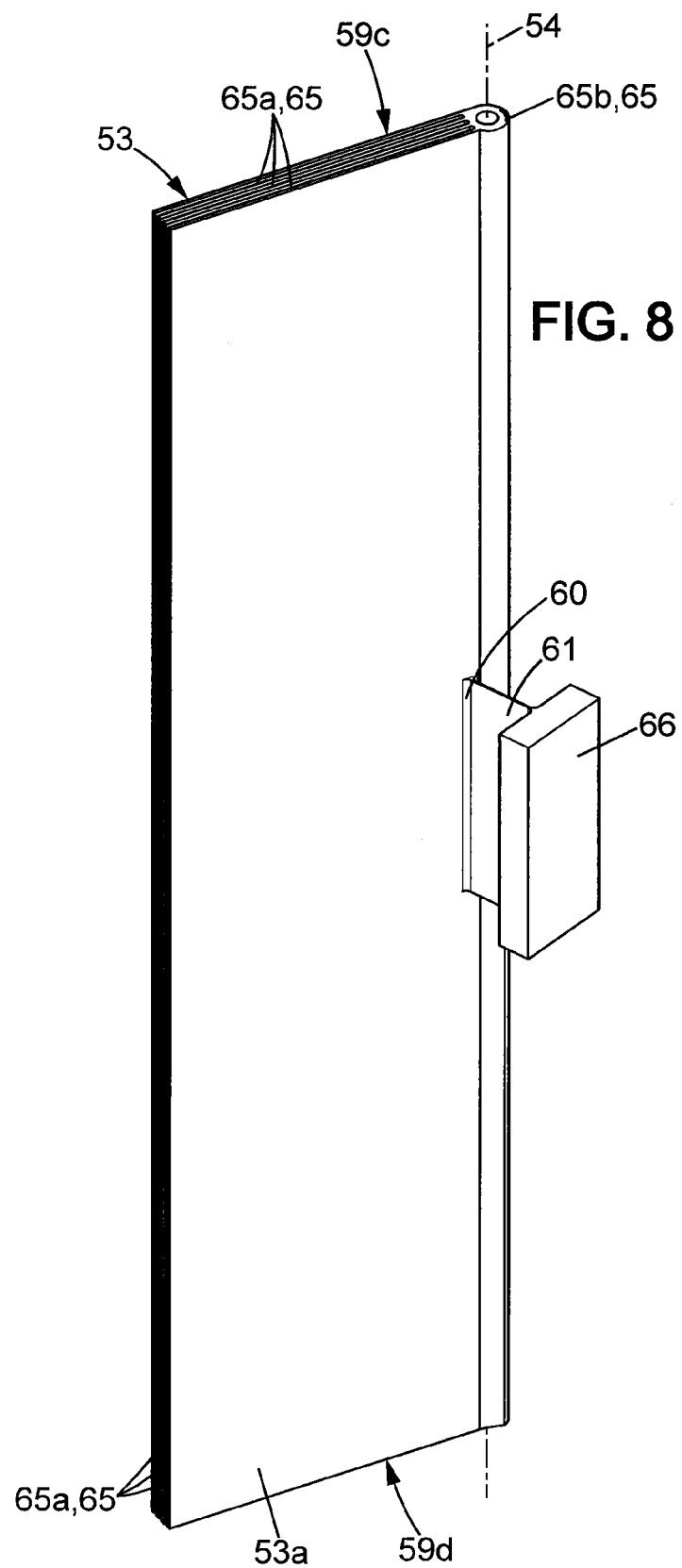

FLUIDIC MICRO-GENERATOR OF SYNTHETIC JETS

PRIORITY CLAIM

The present application claims priority to French application no. 10 60487, filed Dec. 14, 2011, the disclosure of which is hereby incorporated by referenced herein in its entirety.

SUBJECT OF THE INVENTION

The invention relates to the field of micro-generators intended for the control of a main flow of fluid by secondary fluidic jets. The main flow of fluid to be controlled can for example be an external aerodynamic flow such as for the hyperlift of aircraft, the control of the buffeting of aircraft wings, the drag of motor vehicles or of trains of railway vehicles. The main flow to be controlled can also be an internal aerodynamic flow such as the air intakes of aircraft engines.

The flow of a fluid around a structure is modified by secondary fluid jets coming from holes passing through the outer surface of the structure. The invention relates in particular to generators of such secondary jets.

Two types of generators of jets situated inside a structure are distinguished. There are generators of pulsed jets connected to a fluid source independent from the fluid of the main flow. There are also generators of synthetic jets, of zero mean flow, which draw the fluid of the secondary jets from the main flow and then eject it into the flow. The invention more particularly relates to generators of synthetic jets.

STATE OF THE ART

The Application FR2 859 160 describes in particular a generator of synthetic jets equipped with a piezoelectric actuator and a piston and which can be controlled in frequency and in amplitude. However, the speed of the jets that can be emitted may be limited.

Patent Application US2010/0044459 describes several generators of synthetic jets using a layer of stacks of piezoelectric cells distributed on one side of a mechanical membrane delimiting an air cavity. When the cells are activated, the piezoelectric layer contracts or expands. This forces the membrane to bulge. The volume of the cavity is thus reduced and a jet of air is expelled from the cavity through an orifice. The piezoelectric effect has the advantage of simply transforming an electrical voltage into a mechanical deformation. However, such generators of synthetic jets have several drawbacks which limit their applications. The displacement generated by the piezoelectric cells is only of a few micrometers. The deformation of the membrane is significant only if the piezoelectric layer is excited at the natural frequency of vibration of the metal membrane. Once the membrane is resonating, it is difficult to vary the excitation voltage of the piezoelectric layer in order to vary the amplitude of the deformation of the membrane.

Outside the natural resonant frequency of the membrane, the deformation of the membrane obtained by the piezoelectric layer is very small such that the speed of the air jet generated is of little use. When it is desired to control a main flow along a structure and it is desired to vary the frequency of the synthetic jets generated, the generator technology described in the aforesaid document makes it necessary to actuate another generator whose membrane resonates at the desired frequency.

Moreover, the described actuator has a cavity having a large dead volume which behaves like an attenuator of the generated jet. For example, a variation of the volume of the cavity of X mm$^3$ due to the deformation of the membrane generates an increase in the pressure and only a proportion of these X mm$^3$ is ejected from the cavity in the form of synthetic jets.

The article "A High-speed compressible synthetic jet" by T. M. Crittenden et al., Physics of fluids 18, 017107 (2006) describes a generator of synthetic jets in which the speed amplitude of the ejected fluid is fixed for a given frequency of the jet. This has the drawback of not being able to adapt the intensity of the speed of the jet as a function of the disturbance of the main flow.

TECHNICAL PROBLEM SOLVED BY THE INVENTION

The invention proposes a generator of synthetic jets and a device for controlling a fluidic flow using such generators which overcome at least one of the aforesaid drawbacks.

A purpose of the invention is to widen the range of use of generators of synthetic jets in particular by making it possible to control the frequency of the jets and the speed amplitudes of the jets separately.

GENERAL DESCRIPTION OF THE INVENTION

According to an embodiment, the generator of synthetic jets comprises a cavity delimited by a fixed wall and a mobile wall. The fixed wall contains a sleeve and a head provided with an orifice through which the generated jet of fluid is drawn in from and ejected into the main flow of fluid. The mobile wall is opposite the head. The generator comprises a rigid piston including the mobile wall and sliding in a fluid-tight manner in the sleeve. The generator comprises moreover an actuator mechanically linked with the piston and able to drive the piston with an alternating movement having an amplitude and a frequency, the actuator being able to provide a movement of variable amplitude and frequency, at least the amplitude being variable during the movement. The actuator comprises a mechanism for the mechanical amplification of displacement.

It is understood that the amplification of displacement makes it possible to have a significant amplitude of variation of volume of the cavity. The fact that this is obtained by a mechanical amplitude of displacement mechanism and not by natural resonance of the actuator makes it possible to have this significant amplitude available for frequencies outside the mechanical resonant frequency of the actuator.

Moreover, the fact that the mobile wall is included in a rigid piston means that the natural resonant frequency in the direction of sliding of the wall is very much higher than the range of frequency of the jets to be ejected. Thus, the mechanical impedance experienced by the actuator is substantially constant or has slow variation whatever the control frequency of the actuator may be. In other words, the mobile wall does not behave like a frequency filter and the generator can be used over a wider frequency range. Finally, the control in amplitude of the actuator will generate a variation of amplitude of the speed of the generated jets of air, which was not the case of the actuators having a resonant membrane.

According to an embodiment, the actuator comprises a piezoelectric rod.

Advantageously, the mechanism for the mechanical amplification of displacement comprises a deformable mechanical structure, connected to and separate from the piezoelectric rod, said structure being arranged in the generator in such a way that a variation in length of the piezoelectric rod deforms the mechanical structure and causes the displacement of the piston.

Advantageously, the piezoelectric rod has a stack of piezoelectric cells mounted in series along an axis of the rod passing through two opposite ends of the rod. The fact that the piezoelectric cells are arranged in series makes it possible to multiply the variation in length of the piezoelectric rod by the number of cells by simultaneously activating all of the piezoelectric cells. Thus, the variation in thickness by a few micrometers of each piezoelectric cell can generate a variation of length of the piezoelectric rod of a few tens, or even a few hundreds of micrometers. Thus, it is possible to obtain a large displacement of the ends of the rod whilst taking advantage of the capability of the piezoelectric actuators of being controlled at high frequency, for example higher than 1 kHz. However, increasing the amplitude of displacement only by increasing the number of stacked cells would result in increasing the overall dimensions of the generator in a way which is incompatible with the sought application. It is desirable to be able to arrange such generators on the wall of a main flow of fluid. It must still be possible to integrate these generators into the wall delimiting this main flow. The actuation provided by a piezoelectric system is often more limited by its small displacement than by the force generated. Thanks to the mechanical amplitude of displacement mechanism, the displacement of the piston is increased without significantly increasing the overall dimensions of the generator. Jet speeds are obtained which can be close to, or even higher than, the speed of sound. In other words, the fact of having recourse to a mechanical amplification of displacement makes a better compromise possible between the jet speed and the overall dimensions of the generator.

The mechanical amplification of displacement can be by a coefficient of between 5 and 150, preferably between 10 and 100.

Advantageously, the actuator is suitable for the variation of the amplitude of the movement to be controllable in a way that is separate from the variation of the frequency of the movement. In other words, for each frequency of the movement, it is possible to vary the amplitude of that movement over a range and, similarly, at each amplitude it is possible to vary the frequency over a range. The different ranges define a zone of an amplitude/frequency diagram over which the amplitude and the frequency of the movement can be chosen at will.

According to a variant, the generator has a range of frequency of the generated jets. The actuator has a natural resonant frequency in the direction of sliding of the piston higher than said range of frequency of the generated jets. In other words, the actuator has a natural resonant frequency in the direction of sliding of the piston higher than a predetermined threshold, intended to be outside a range of frequency of the generated jets.

In this variant, not only does the mobile wall not have resonance in the frequency range of the generated jets, but the actuator itself has a mechanical impedance varying slowly in the operating range. This makes the generator of synthetic jets possible to be used in open loop, since a control instruction for the actuation is equivalent to a control of the frequency and/or the amplitude of the speeds of generated jets.

According to an embodiment, the actuator is mechanically linked to a point of connection of the piston by a connection means which exhibits at least one direction of rigidity along which the connection means is able to transmit a force and a displacement of the actuator and which is mobile in a direction transverse to the direction of rigidity.

Advantageously, the connection means is a bridge of material able to transmit a displacement of the actuator without exhibiting mechanical play.

Advantageously, the bridge of material is elastically deformable in flexion in a direction transverse to the direction of rigidity.

According to a variant, the piston is mobile in translation, parallel with the displacement of said point of connection.

According to another variant, the piston is mobile in rotation about an axis which is transverse to the displacement of said point of connection and distant from this point.

Advantageously, the axis of the piezoelectric rod is substantially perpendicular to the direction of sliding of the piston. In the variant where the piston is mobile in rotation, the axis of the piezoelectric rod is advantageously perpendicular to the direction of displacement of the point of the piston where the actuator is connected. In an even more advantageous manner, the axis of the piezoelectric rod is parallel with the axis of rotation of the piston. This makes it possible to reduce the overall dimensions of the micro-generator under the wall delimiting the main flow to be controlled. Moreover, this reduction of overall dimensions is compatible with a side-by-side juxtaposition of several micro-actuators.

Advantageously, the generator comprises a means of guiding the sliding of the piston in the sleeve, this means being separate from the sleeve itself.

According to a variant, the piston has a fluid-tight surface extending facing a sliding zone of the sleeve, the fluid-tight surface or the sliding zone being provided with at least one groove constituting a load loss opposing a flow of the fluid between the fluid-tight surface and the sliding zone.

According to another variant, the generator comprises an annular elastomer seal having a radially inside edge fixed on the perimeter of the piston and a radially outside edge fixed to the fixed wall. The annular seal prevents leakages of fluid between the piston and the fixed wall. As the elastomer is very soft and the displacements of the piston are small (for example of the order of 500 µm), the dissipation of energy due to the seals is low and does not cause resonance in the sought frequency range, for example from 10 to 1000 Hertz.

Moreover, according to a variant, the actuator is controlled in open loop, in frequency and/or in amplitude.

According to another variant, the generator comprises a device for the servo-control of the actuator connected to a means of receiving a jet speed and frequency instruction and connected to a sensor of the displacement of the piston.

This other variant can be used as an alternative to or in combination with the previous variant. The servo-control as a function of the displacement of the piston makes it possible to overcome the variation of mechanical impedance in the operating range.

According to an embodiment, the actuator comprises four arms connected in succession to each other by four connection points in order to jointly form a closed loop, said successive connection points being respectively connected to the fixed wall, to one of the ends of the piezoelectric rod, to the piston, and to the other end of the piezoelectric rod. The loop formed by the four arms concatenated with each other can for example be of the articulated lozenge or ellipse type. This loop constitutes a possible variant of the deformable structure, connected to and separate from the piezoelectric rod, which allows the mechanical amplification of the displacement generated by the rod.

The rod acts on one of the axes of the loop which then deforms along the other axis. According to the dimensions of the loop, this conversion of movement can be done with amplification of the displacement of the piston.

In a variant, the actuator contains one or more lever arms comprising a fixed pivot point of connection, a point of connection to one end of the piezoelectric rod and a point of connection with the piston. These lever arms, each articulated about a fixed pivot, constitute another possible variant of deformable structure allowing the amplification of displacement.

Advantageously, all the aforesaid points of connection of the actuator are pivot axes constituted by a bridge of material that is elastically deformable in such a way as not to exhibit mechanical play. The absence of mechanical play allows the transmission of movements to take place in a symmetrical manner, both for the ejection of fluid from the cavity and for the intake of fluid from the main flow to the inside of the cavity.

According to an embodiment, the cavity has a volume which varies between a dead volume and a maximum volume depending on the position of the piston, and in which the dead volume is less than or equal to half of the maximum volume, preferably less than a fifth of the maximum volume, in particular less than a tenth of the maximum volume. The reduced dead volume makes it possible to improve the conversion of the volume of fluid displaced by the piston into a volume of fluid passing through the orifice.

According to one embodiment, the generator comprises a main body to which the actuator and then the piston are firmly connected. The generator comprises moreover a fixed cover with respect to the main body and delimiting the cavity by an internal flat surface. The piston delimits the cavity by a flat frontal surface arranged parallel to the inside surface of the cover. The parallelism between the inside surface of the cover and the rigid frontal surface of the piston makes it possible to reduce the dead volume to virtually zero.

Advantageously, the generator comprises an adjustment shim arranged between the cover and the main body. The piston slides in the adjustment shim. This makes it possible to adjust the dead volume to the strict minimum without being penalized by the manufacturing tolerances of the actuators.

Advantageously, the servo-control device is connected to the electrical power supply of the piezoelectric rod, the piston displacement sensor comprising a bridge of gauges arranged on the arms of the loop.

Advantageously, the actuator comprises a single-piece deformable body including a mounting base, the four looped arms and a flange for connection to the piston.

Advantageously, the actuator comprises a first mechanism controlled in frequency or in amplitude, connected in series with a second mechanism controlled in amplitude only. The first mechanism can advantageously comprise a piezoelectric rod and the second mechanism can be a conventional actuator suitable for slow variations. The second mechanism can be used for modifying the position of the point of support of the first mechanism and thus shift the mid point of the travel of the piston and vary the dead volume of the cavity. In particular, it is thus possible to optimise the dead volume of the cavity during the variation of amplitude generated by the first mechanism.

According to another aspect, the invention also relates to a device for the control of a fluidic flow by synthetic jets comprising a main wall along which a fluid flows and comprising a generator of the above-mentioned synthetic jets, in which the orifice passes through the main wall and connects the cavity to the flow of fluid, and in which the cavity is filled with this same fluid.

BRIEF DESCRIPTION OF THE FIGURES

The present invention will be better understood on studying the detailed description of some embodiments taken by way of non-limitative example and illustrated by the attached drawings in which:

FIG. 4 is a transverse cross-section through the plane IV-IV of FIG. 3, and FIG. 5 is a partial transverse cross-section through the plane V-V of FIG. 4.

FIG. 8 is a perspective view of the piston of the embodiment shown in FIGS. 6 and 7.

DETAILED DESCRIPTION OF THE INVENTION

Figure 1:
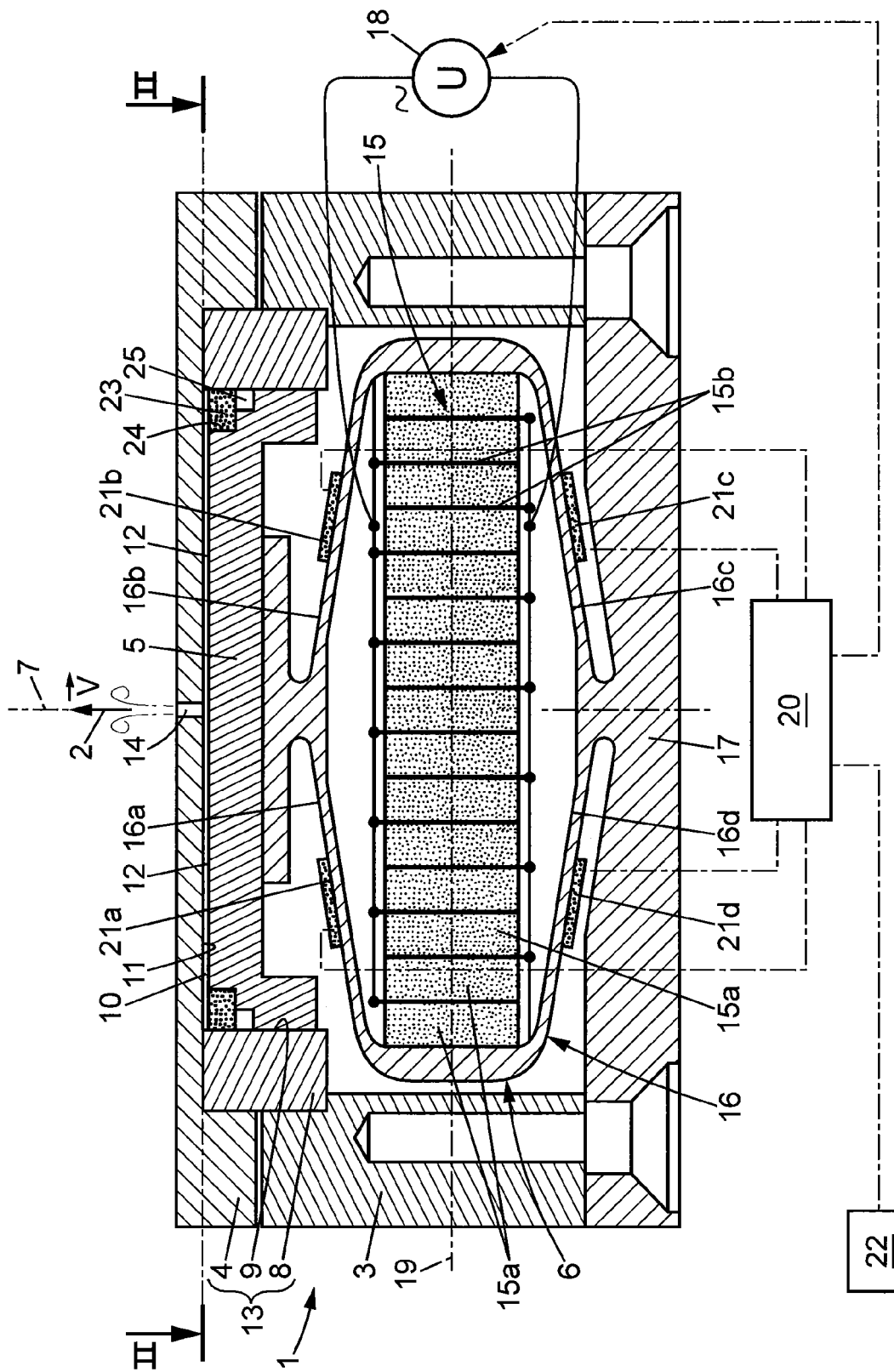
FIG. 1 is a longitudinal cross-section of a first embodiment of a generator of synthetic jets.
Figure 2:
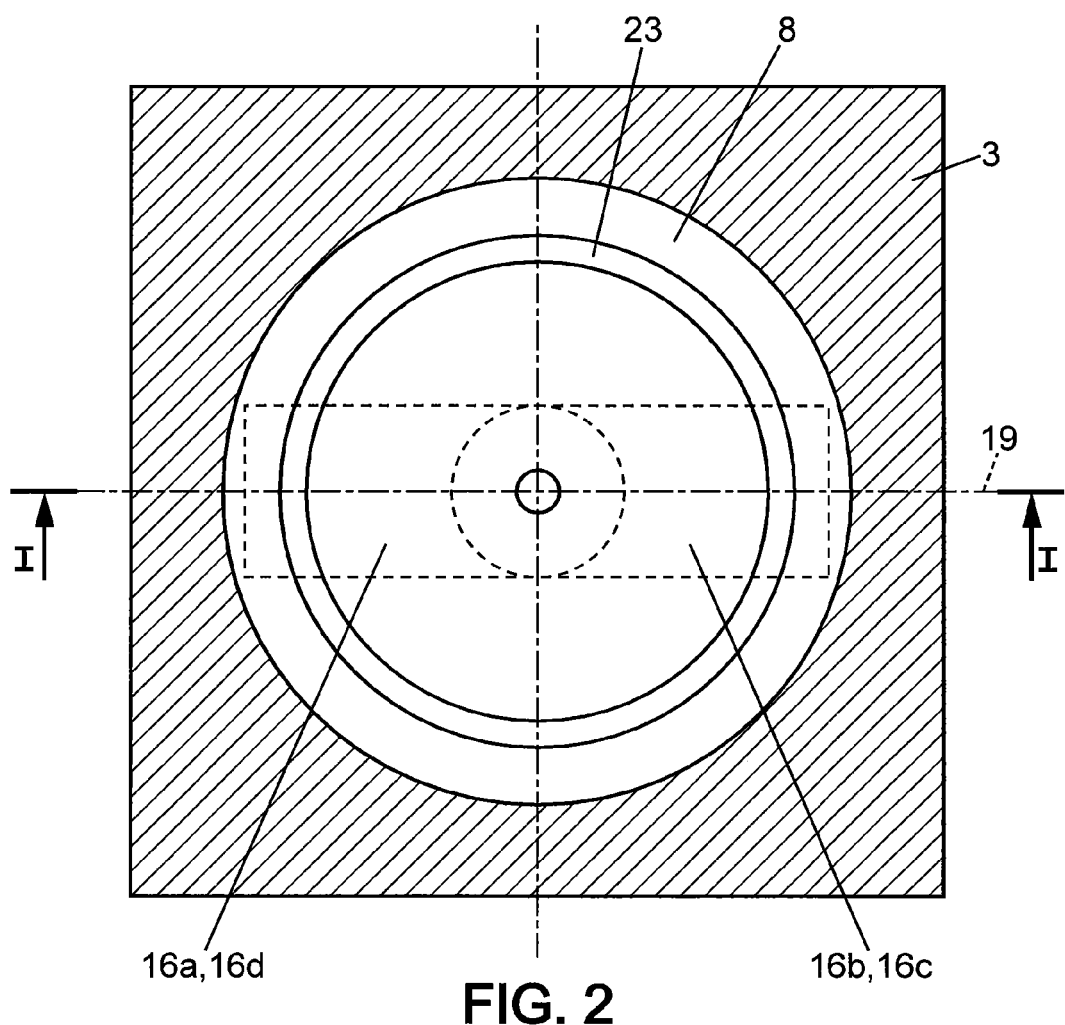
FIG. 2 is a transverse cross-section through the plane II-II of FIG. 1.

As shown in FIGS. 1 and 2, the generator 1 of synthetic jets 2 comprises a main body 3 of substantially parallelepipedic external shape, a head 4, a cylindrical piston 5 and an actuator 6. The actuator 6 drives the piston 5 in a direction 7 of sliding of the piston 5. The generator 1 comprises moreover a cylindrical sleeve 8 which is coaxial with the direction 7 of sliding. The cylindrical piston 5 is adjusted to an internal diameter 9 of the sleeve 8. The sleeve 8 also serves as an adjustment shim 8 which is sandwiched between the cover 4 and the main body 3 by a system of screws which is not shown. The generator 1 has a cavity 10 delimited by an internal surface 11 of the head 4 which is flat, and against which the sleeve 8 bears in a fluid-tight manner. The piston 5 has a flat frontal surface 12 parallel to the internal surface 11 of the head 4 and perpendicular to the direction of sliding 7 of the piston 5. The head 4 and the sleeve 8 together constitute a fixed wall 13 delimiting the cavity 10. The frontal surface 12 of the piston 5 constitutes a mobile wall 12 of the cavity 10. The head 4 has an orifice 14 opening into the cavity 10.

The actuator 6 is constituted by a piezoelectric rod 15 and by a set of four arms 16a, 16b, 16c, 16d concatenated between each other in order to form together a deformable structure 16 in the form of a closed loop. A first end of the piezoelectric rod 15 is connected by the arm 16a to the piston and by the arm 16d to a base 17 fixed to the main body 3. The other end of the piezoelectric rod 15 is connected by the arm 16b to the piston 5 and by the arm 16c to the base 17. Thus, when the piezoelectric rod 15 lengthens, the piston 5 moves closer to the base 17, the cavity 10 increases in volume and fluid is drawn into the cavity 10. Conversely, when the piezoelectric rod 15 contracts, the piston 5 moves away from the base 17 and fluid is expelled from the cavity 10.

Each of the ends of the piezoelectric rod 15 constitutes a point of connection of the arms 16a and 16d on the one hand, and of the arms 16b and 16c on the other hand. The opposite ends of the arms 16a and 16b are joined together in a point of connection integral with the piston 5 and having the form of a constriction of material such as to allow the slight deformations of the arms 16a, 16b, without mechanical play, whilst transmitting the axial force to the piston 5. Similarly, the arms 16c and 16d have ends, opposite to those connected to the piezoelectric rod 15, which are connected at a single point of connection with the base 17. This latter point of connection is constituted by a constriction of material. The set of the arms 16a, 16d is symmetrical with the arms 16b, 16c with respect to a plane passing through the direction of sliding 7 and perpendicular to the piezoelectric rod 15. The arms 16a, 16b are symmetrical with the arms 16c, 16d with respect to a plane of symmetry 19 of the piezoelectric rod 15 and perpendicular to the direction of sliding 7.

The piezoelectric rod is constituted by a stack of piezoelectric cells 15a separated from each other by electrodes 15b one in every two of which is electrically connected together and to one of the terminals of an excitation voltage generator 18 whilst the other electrodes 15b are connected to each other and to the other terminal of the excitation voltage generator 18. The excitation electrodes 15b are perpendicular to the plane of symmetry 19 of the rod 15.

The generator 1 of synthetic jets also comprises a sensor of the axial displacement of the piston 5, the sensor being constituted by a set of four strain gauges 21a, 21b, 21c, 21d arranged on each of the arms 16a, 16b, 16c, 16d. A servo-control device 20 is connected to a means of receiving an ejected jets frequency and speed amplitude instruction as well as to the generator 18 of excitation voltage of the piezoelectric rod 15.

Obtaining a certain level of energy of synthetic jets amounts to increasing the speed of ejection of the fluid for a given cross-section of the ejection orifice. This is due to an accumulation of several types of amplification. A first type of amplification is due to the ratio between the surface area of the mobile wall delimiting the cavity and the surface area of the orifice. The inventor discovers that the surface area of the free wall cannot be increased indefinitely because this raises a problem of rigidity of the piston which is difficult to achieve in a light piston. Too big a piston would cause stray resonances in the cavity. Another type of amplification is due to the concatenation of a large number of piezoelectric cells in the rod. However, the number of cells of the piezoelectric rod is limited by the overall dimensions and by the vibrational behaviour of a very long rod. The fact of having recourse to another type of amplification by a mechanism for the mechanical amplification of displacement makes it possible to obtain a high level of energy of the synthetic jets generated and good compactness of the generator.

Each of the strain gauges 21a, 21b, 21c, 21d comprises a portion of gauge measuring the longitudinal extension of the corresponding arm 16a, 16b, 16c, 16d. In an advantageous but not obligatory manner, each of the strain gauges 21a, 21b, 21c, 21d also comprises a portion of gauge measuring the transverse extension of the arm in order to take account of the Poisson coefficient of the material of the arm.

In a variant, the sensor of axial displacement of the piston 5 comprises only the strain gauges 21a and 21b previously described with their variants. The two strain gauges are connected as a half-bridge for measuring the axial displacement of the piston 5.

An annular elastomer seal 23 is arranged in a peripheral notch 24 of the piston 5 while being compressed by its radially inside edge on the piston 5 and by its radially outside edge on the adjustment shim 8. The piston also has an external recess 25 so that each side of the portion of the elastomer seal 23 in contact with the adjustment shim 8 is free to allow the deformation of the elastomer seal 23 during the axial sliding of the piston 5. The travel of the piston 5 being of the order of 500 microns, the diameter of the piston 5 is between 10 and 20 millimeters, for example approximately 15 millimeters, the radial thickness of the elastomer seal 23 is less than one millimeter and can for example be made of silicone.

In a variant, the actuator is constituted by several sets of four arms each equipped with a transverse rod 15. The sets are mounted one upon another in series axially in such a way as to further increase the mechanical amplification of the axial displacement without reducing the driving force of the piston 5. It then becomes possible to move the mid point of the travel of the piston.

Figure 3:
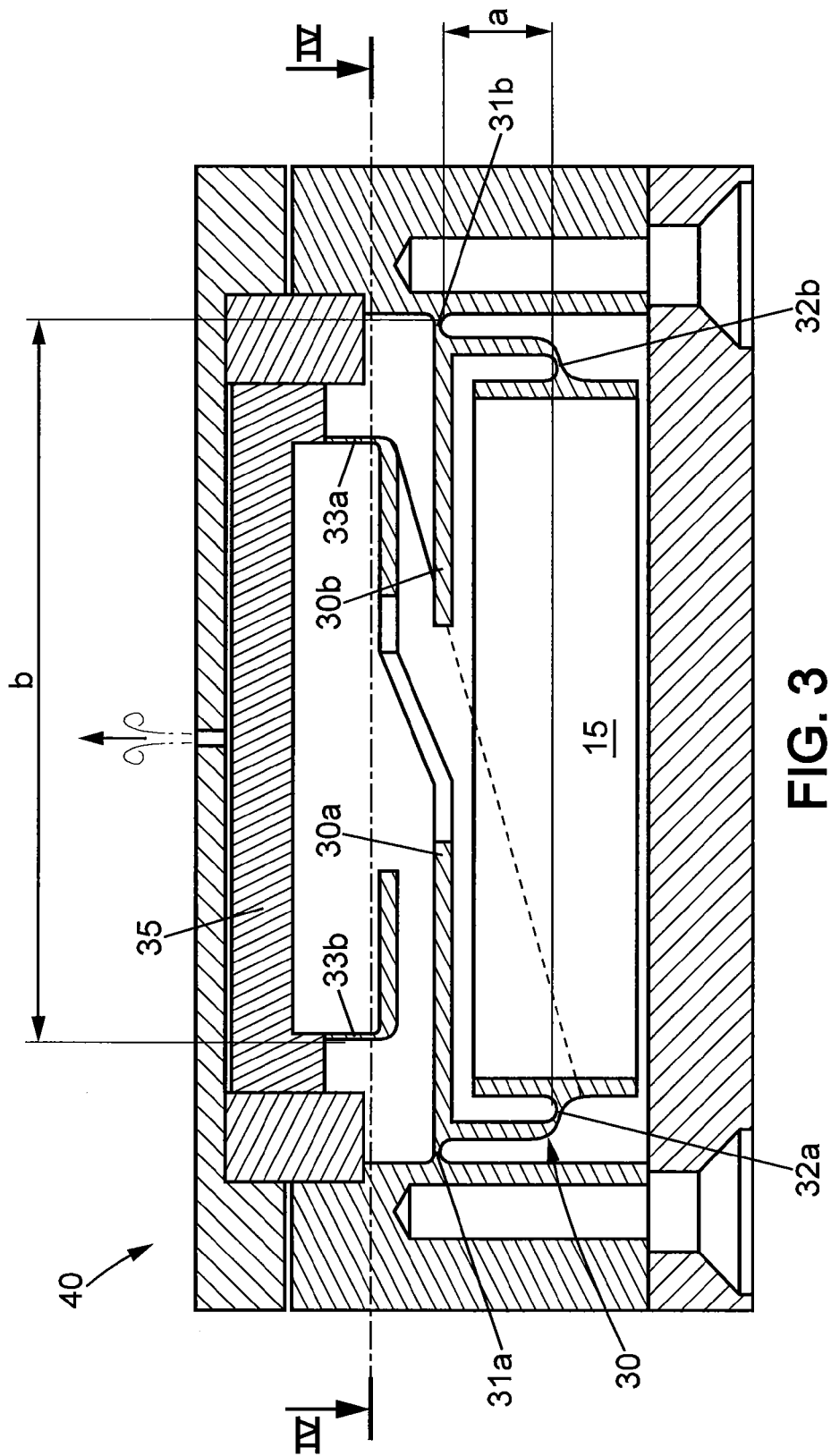
FIG. 3 is a longitudinal cross-section through the plane of FIG. 4, of a second embodiment of a generator of synthetic jets.

Referring to FIGS. 3 to 5, there will now be described a generator 40 comprising a mechanical displacement amplification mechanism 30 including a pair of lever arms 30a, 30b. Each lever arm 30a, 30b is articulated with respect to the main body 3 by a constriction of material in the form of a hinge 31a, 31b and has the shape of a bracket in order to ensure its rigidity. The piezoelectric rod 15 is connected by one its ends to a short side (a) of each of the lever arms 30a and 30b by the intermediary of a second constriction of material in the form of a hinge 32a, 32b parallel with the first hinge 31a, 31b. A long side (b) of the lever arm is connected by a third hinge 33a, 33b, also parallel to the first hinge 31a, 31b, to the piston 5.

The lever arms 30a and 30b are shown in FIG. 3 as formant a one-piece assembly with the body 3. A person skilled in the art will be able to use any one of the well-known assembly techniques for producing this assembly. For example, each lever arm 30a, 30b can be initially independent and have a mounting lug beyond the hinge-shaped constriction 31a, 31b. The mounting lug can then be welded onto the body 3.

The piston 35 slides in the direction of sliding 7 but has a rectangular frontal surface 12, elongated in the same direction as the piezoelectric rod 15. This makes it possible to juxtapose several generators of synthetic jets side by side in the direction of the width of the piston 35 in such a way as to generate an aligned succession of synthetic jet orifices 14.

The rectangular shape of the piston 35 is of course compatible with the mechanical displacement amplification device depicted in FIGS. 1 and 2. Similarly, the system of the lever arms shown in FIG. 3 is compatible with a cylindrical piston 5.

In another variant, the generator of synthetic jets does not have an adjustment shim 8.

Figure 6:
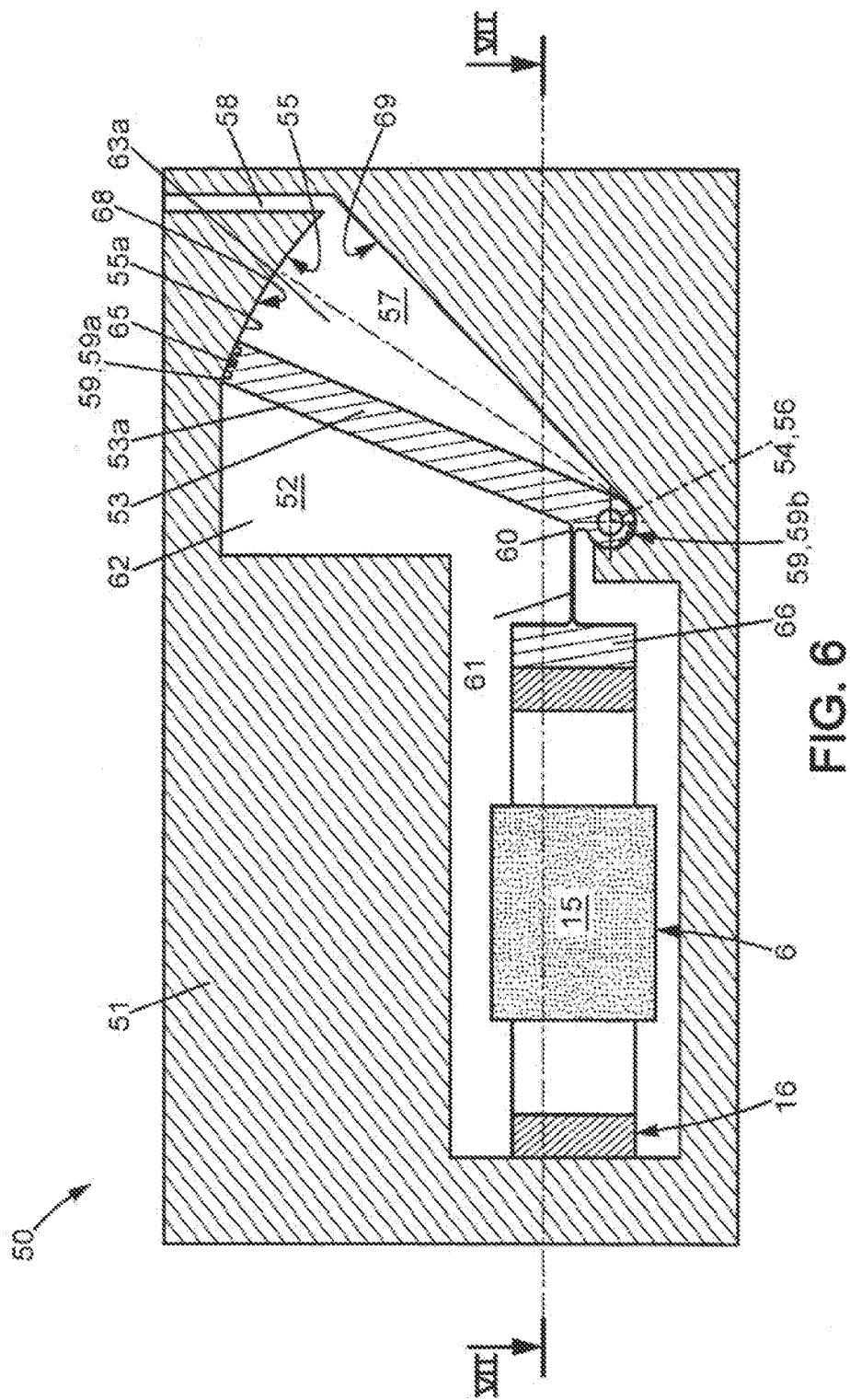
FIG. 6 is a cross-section through the plane VI-VI of FIG. 7, and shows another embodiment equipped with a piston mounted such that it rotates about an axis.

A generator 50 which comprises the same actuator 6 as the embodiment described in FIGS. 1 and 2 will now be described with reference to FIGS. 6 to 8. The generator 50 comprises a main body 51 having a recess 52. This recess 52 passes throughout the main body 51. The generator 50 also comprises a piston 53 in the form of a flap pivoting in rotation in the main body 51 about an axis of rotation 54. The generator 50 comprises moreover a cylindrical sleeve 68.

The recess 52 comprises a cavity 57 delimited by a cylindrical surface 55 concentric with the axis of rotation 54. The generator 50 comprises a means 56 of guiding the piston 53 in rotation. Said means 56 is constituted by a shaft and a rotary bearing, which is not shown, designed such that the piston 53 does not rub against the cylindrical surface 55. Advantageously, the means 56 of guiding can be designed for guiding without play in the radial and/or axial directions of the axis 54 of rotation.

The recess 52 comprises an orifice 58 which connects the cavity 57 to the exterior of the generator 50. The orifice 58 has the shape of a slot extending all along the recess 52, parallel with the axis of rotation 54.

The flap serving as a piston 53 comprises a side 59a extending opposite a sliding zone 55a of the cylindrical surface 55. The portion of the main body 51 extending between the sliding zone 55a and the orifice 58, as well as the portion extending radially between the orifice 58 and the axis 54 constitutes a head 69.

The displacement of the piston 53 by the actuator 6 is illustrated by the dotted and dashed line. The position shown in a solid line corresponds to the extreme low position of the piston. Advantageously, the extreme high position of the piston 53 can be that where the piston 53 is in alignment with or flush with the orifice 58.

The flap serving as a piston 53 has a generally flattened parallelepipedic shape and however has a side 59b, close to the axis 54 and having a substantially cylindrical shape. A face 53a of the piston 53, is parallel with the axis 54 and is positioned on a side oriented to the outside of the cavity 57. The face has a point of connection 60 situated at a distance from the axis of rotation 54. During the displacement of the piston 53, the point of connection 60 describes an arc of circle. A means of connection 61 is constituted by a fine lamina extending parallel with the axis 54 and embedded, by one of its edges, at the point of connection 60 and by an opposite edge to the actuator 6. The fine lamina constitutes a bridge of material making it possible to transmit a force and a displacement of the actuator 6 in a direction parallel with the lamina with a degree of flexibility due to the flexion of the lamina.

Figure 7:
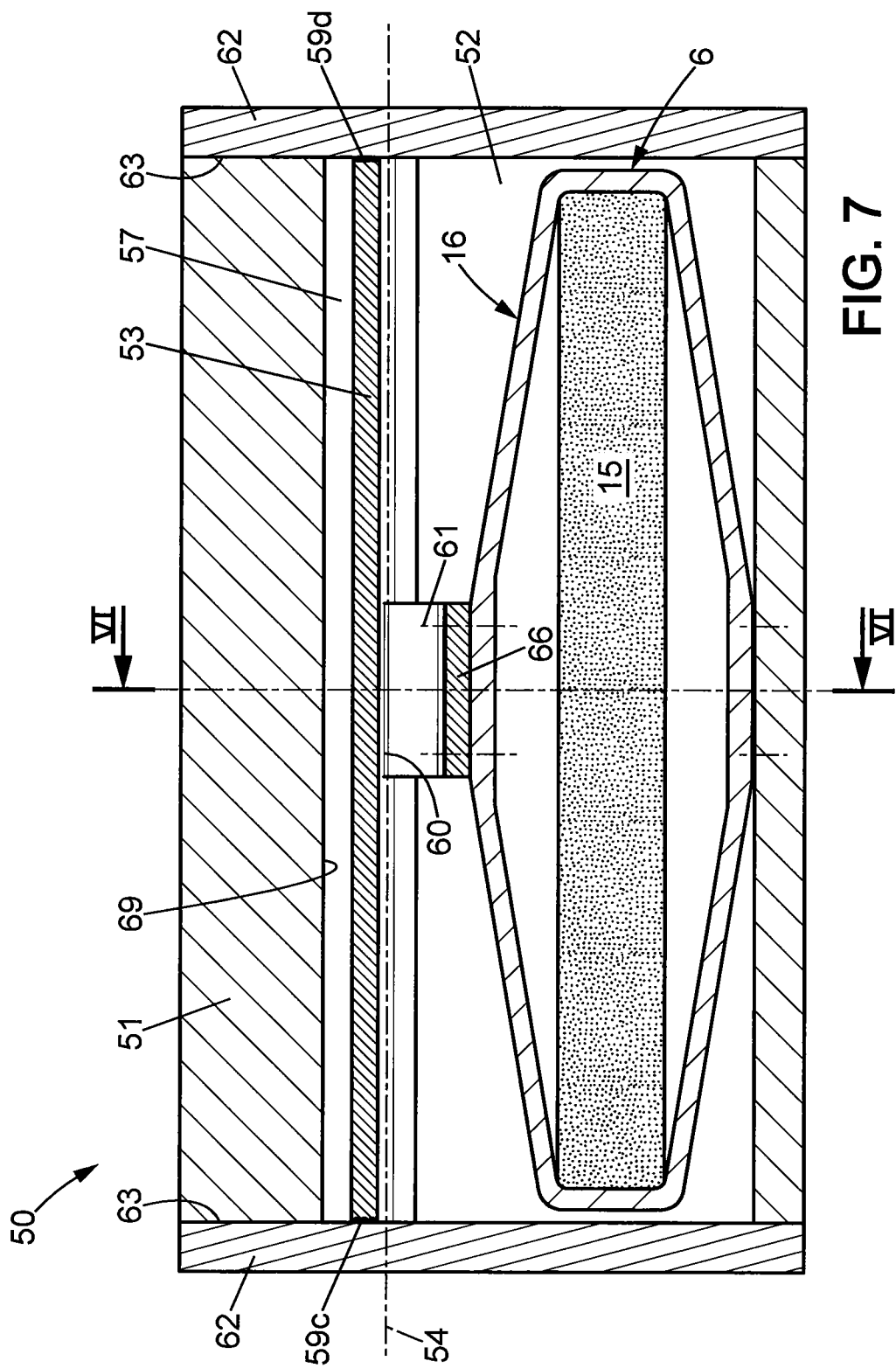
FIG. 7 is a cross-section through the plane VII-VII of FIG. 6.

As shown in FIG. 7, the actuator 50 comprises two lateral sides 62 fixed to the main body 51. Each of the lateral sides 62 comprises a face 63 extending perpendicular to the axis 54 and covering, in a fluid-tight manner, the two ends of the recess 52. The parallelepipedic piston 53 comprises two lateral sides 59c and 59d which are parallel with and opposite the faces 63. The sliding zone 55a of the main body 51 is extended by a portion 63a of the faces 63 which is opposite the sides 59c and 59d during the pivoting of the piston 53.

As shown in FIG. 8, the piston 53 is equipped with at least one groove 65, here with three parallel grooves 65 extending virtually all along the perimeter of the flattened parallelepipedic shape of the piston 53. A first zone 65a of the grooves 65 extends along the side 59a and the two lateral sides 59c and 59d. Another zone 65b of the grooves 65 extend along the side 59b. The sides 59a, 59b, 59c, 59d together constitute a fluid-tight zone 59 of the piston 53.

The piston 53 is part of a one-piece assembly furthermore comprising the bridge of material 61 in the form of a lamina and a connecting base plate 66 connecting the bridge 61 to the actuator 6. Thus, the bridge of material 61 in the form of a lamina has two directions of rigidity in the plane of the lamina. One of the directions of rigidity is parallel with the hinge the lamina 61 connected with the point of connection 60, the other is substantially perpendicular to this hinge. The bridge of material 61 is moreover elastically deformable by flexion in a transverse direction with respect to the plane of the lamina 61. This makes it possible for the bridge of material 61 to transmit, in the plane of the lamina, a force and a displacement of the actuator towards the point of connection without exhibiting mechanical play.

In a variant, the means of connection 61 between the actuator 6 and the piston 53 is a connecting rod articulated at the point 60 of connection and/or on an end of the actuator 6.

In a variant, the means of connection 61 can be embedded in or integral with the actuator 6.

The base plate 66 is fixed on the actuator 6, and the actuator 6 is fixed in the main body 51. The piston 53, in the form of a flap, pivots without play about the axis 54 and exhibits low mechanical friction at the only rotational bearing of the guiding means 56.

This virtually total absence of mechanical friction and play allows a very high linearity of the response of the generator 50. The generator 50 exhibits a substantially constant ratio between the amplitude variations of the alternating supply voltages of the piezoelectric rod 15 and the amplitude variation of the fluid speed of the generated jets.

Moreover, the radial distance between the connecting bridge 60 and the axis of rotation 54 is of the order of $1/20^{th}$ to $1/3$ of the radius of the cylindrical surface 55. This provides a lever effect which contributes to the mechanical amplification of movements. In fact, this increases the ratio of the variation of the volume of the cavity 57 to the displacement generated by the actuator 6. The mechanical amplification due to the deformable structure 16 can generate a displacement of the actuator 6 of five to 15 times, in particular of 10 times. The displacement of the piezoelectric rod and the amplification due to the lever effect can generate a variation of volume of the cavity 57 divided by the surface area of the piston 53 of 1.5 to 10 times the displacement of the actuator 6.

The fact that the orifice 58 is in the form of a slot makes it possible to act efficiently on the main flows exhibiting a direction along which the dynamic characteristics of the main flow vary little.

In a variant, the above guiding means 56 can be constituted by a bridge of material in the form of a lamella protruding from the side 59b of the flap and fitted in the main body 51. The flexion of this lamella is then accompanied by a movement of the piston 53 which substantially corresponds to the rotation about the axis of rotation 54.

In a variant, the actuator 6 can be replaced by the actuator 30 described in FIGS. 3 and 4.

In a variant, the embodiment shown in FIGS. 1 and 2 can be devoid of an elastomer seal and can comprise sealing grooves similar to the grooves 65.

The invention claimed is:

1. A generator of synthetic jets for a main flow of fluid, the generator comprising:
   a cavity delimited by a fixed wall and by a mobile wall,
   the fixed wall comprising a sleeve and a head, the head being provided with an orifice through which the synthetic jet of fluid is to be drawn in from the main flow of fluid and is to be ejected into the main flow of fluid, the mobile wall being opposite the head;
   a rigid piston including the mobile wall and sliding in a fluid-tight manner in the sleeve, and
   an actuator mechanically linked with the piston and able to drive the piston with an alternating movement having variable amplitude and frequency, at least with amplitude being variable during the movement, the actuator comprising a mechanism for the mechanical amplification of displacement.

2. The generator according to claim 1, having a range of frequency of the jets and wherein the actuator has a natural resonant frequency in the direction of sliding of the piston higher than said range of frequency of the jets.

3. The generator according to claim 1, wherein the actuator comprises a piezoelectric rod.

4. The generator according to claim 3, wherein the piezoelectric rod is elongated along an axis substantially perpendicular to the direction of sliding of the piston.

5. The generator according to claim 3, wherein the mechanism for the mechanical amplification of displacement comprises a deformable mechanical structure connected to and separate from the piezoelectric rod, said structure being arranged in the generator in such a way that a variation in length of the piezoelectric rod deforms the mechanical structure and causes the displacement of the piston.

6. The generator according to claim 1, wherein the actuator is mechanically linked to a point of connection of the piston by a connection piece which exhibits at least one direction of rigidity along which the connection piece is able to transmit a force and a displacement of the actuator and which is mobile in a direction transverse to the direction of rigidity.

7. The generator according to claim 6, wherein the piston is mobile in translation, parallel with the displacement of said point of connection or is mobile in rotation about an axis which is transverse to the displacement of said point of connection and distant from this point.

8. The generator according to claim 1, comprising a guiding mechanical arrangement for guiding the sliding of the piston in the sleeve, said guiding mechanical arrangement being separate from the sleeve itself.

9. The generator according to claim 1, wherein the piston has a fluid-tight surface extending facing a sliding zone of the sleeve, the fluid-tight surface of the sliding zone being provided with at least one groove constituting a load loss opposing a flow of the fluid between the fluid-tight surface and the sliding zone.

10. The generator according to claim 1, comprising an annular elastomer seal having a radially inside edge fixed on the perimeter of the piston and a radially outside edge fixed to the fixed wall.

11. The generator according to claim 1, wherein the cavity has a volume which varies between a dead volume and a maximum volume depending on the position of the piston.

12. The generator according to claim 3, comprising a device for the servo-control of the actuator connected to a receiver for receiving a jet speed and frequency instruction and connected to a sensor of the displacement of the piston.

13. The generator according to claim 12, wherein the actuator comprises four arms connected in succession to each other by four connection points in order to jointly form a closed loop, said successive connection points being respectively connected to the fixed wall, to one of the ends of the piezoelectric rod, to the piston and to the other end of the piezoelectric rod, and wherein the servo-control device is connected to the electrical power supply of the piezoelectric rod, the piston displacement sensor comprising a bridge of gauges arranged on the arms of the loop.

14. The generator according to claim 1, said mechanism for the mechanical amplification of displacement is a first mechanism and is controlled in frequency and in amplitude, the actuator further comprising a second mechanism, controlled in amplitude only and connected in series with said first mechanism.

15. A fluidic micro-actuator using synthetic jets comprising a main wall along which a fluid flows and comprising a generator of synthetic jets according to claim 1, wherein the orifice passes through the main wall and connects the cavity to the flow of fluid, and in wherein the cavity is filled with this same fluid.

16. A generator of synthetic jets for a main flow of fluid, the generator comprising:
a cavity delimited by a fixed wall and by a mobile wall,
the fixed wall comprising a sleeve and a head, the head being provided with an orifice through which the generated jet of fluid is to be drawn in from the main flow of fluid and is to be ejected into the main flow of fluid,
the mobile wall being opposite the head;
a rigid piston including the mobile wall and sliding in a fluid-tight manner in the sleeve, the piston being mobile in translation, and
an actuator mechanically linked with the piston and able to drive the piston with an alternating movement having variable amplitude and frequency, at least the amplitude being variable during the movement, the actuator comprising a piezoelectric rod and a mechanism for the mechanical amplification of displacement.

17. The generator according to claim 16, comprising an annular elastomer seal having a radially inside edge fixed on the perimeter of the piston and a radially outside edge fixed to the fixed wall.

18. A generator of synthetic jets for a main flow of fluid, the generator comprising:
a cavity delimited by a fixed wall and by a mobile wall,
the fixed wall comprising a sleeve and a head, the head being provided with an orifice through which the generated jet of fluid is to be drawn in from the main flow of fluid and is to be ejected into the main flow of fluid,
the mobile wall being opposite the head;
a rigid piston including the mobile wall and sliding in a fluid-tight manner in the sleeve, and
an actuator mechanically linked with the piston and able to drive the piston with an alternating movement having variable amplitude and frequency, at least the amplitude being variable during the movement, the actuator comprising a piezoelectric rod and a mechanism for the mechanical amplification of displacement,
wherein the actuator is mechanically linked to a point of connection of the piston by a connection element which exhibits at least one direction of rigidity along which the connection element is able to transmit a force and a displacement of the actuator and which is mobile in a direction transverse to the direction of rigidity:
wherein the piston is mobile in rotation about an axis which is transverse to the displacement of said point of connection and distant from this point.

19. The generator according to claim 18, comprising a guiding mechanism for guiding the sliding of the piston in the sleeve, said guiding mechanism being separate from the sleeve itself.

20. The generator according to claim 18, wherein the piston has a fluid-tight surface extending facing a sliding zone of the sleeve, the fluid-tight surface or the sliding zone being provided with at least one groove constituting a load loss opposing flow of the fluid between the fluid-tight surface and the sliding zone.

21. The generator according to claim 11, wherein the dead volume is less than or equal to half of the maximum volume.

22. The generator according to claim 11, wherein the dead volume is less than a fifth of the maximum volume.

* * * * *